US011323585B2

(12) United States Patent
Lee et al.

(10) Patent No.: US 11,323,585 B2
(45) Date of Patent: May 3, 2022

(54) GUIDE ELEMENT FOR PAPER ALIGNMENT

(71) Applicant: HEWLETT-PACKARD DEVELOPMENT COMPANY, L.P., Spring, TX (US)

(72) Inventors: Junghoon Lee, Suwon (KR); Takuya Ito, Yokohama (JP); Dusic Kong, Suwon (KR); Yunjeong Jeong, Pangyo (KR); Jangwon Seo, Pangyo (KR); Yongkon Jo, Suwon (KR); Yonghee Jang, Suwon (KR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/050,565

(22) PCT Filed: Jun. 26, 2019

(86) PCT No.: PCT/US2019/039253
§ 371 (c)(1),
(2) Date: Oct. 26, 2020

(87) PCT Pub. No.: WO2020/009873
PCT Pub. Date: Jan. 9, 2020

(65) Prior Publication Data
US 2021/0243328 A1   Aug. 5, 2021

(30) Foreign Application Priority Data
Jul. 2, 2018 (KR) .................. 10-2018-0076511

(51) Int. Cl.
H04N 1/04 (2006.01)
H04N 1/12 (2006.01)
H04N 1/00 (2006.01)

(52) U.S. Cl.
CPC .......... *H04N 1/123* (2013.01); *H04N 1/0079* (2013.01); *H04N 1/00689* (2013.01); *H04N 1/00697* (2013.01); *H04N 1/00716* (2013.01)

(58) Field of Classification Search
None
See application file for complete search history.

(56) References Cited

U.S. PATENT DOCUMENTS 5,887,866 A * 3/1999 Yamauchi ............ B65H 3/5261
271/116
8,226,080 B2  7/2012 Morita et al.
(Continued)

FOREIGN PATENT DOCUMENTS

JP    624604    2/1994
JP   6321404   11/1994
(Continued)

*Primary Examiner* — Dung D Tran
(74) *Attorney, Agent, or Firm* — Staas & Halsey LLP

(57) ABSTRACT

An image scanning apparatus includes an image sensor to scan a manuscript, a transfer apparatus to pick up the manuscript and move the manuscript to a manuscript transfer path, and a loading apparatus to load the manuscript scanned by the image sensor. The loading apparatus includes a discharge tray to hold a discharged manuscript and a guide member to have one end rotatably disposed on the manuscript above an upper part of the discharge tray at an angle formed relative to the discharge tray based on a type of the manuscript.

14 Claims, 11 Drawing Sheets

(56) References Cited

U.S. PATENT DOCUMENTS

| | | | | |
|---|---|---|---|---|
| 2009/0218748 A1* | 9/2009 | Kusama | ............ | H04N 1/00604 |
| | | | | 271/3.14 |
| 2011/0006472 A1* | 1/2011 | Hirai | ................. | G03G 15/6552 |
| | | | | 271/220 |
| 2015/0274475 A1* | 10/2015 | Ohta | ..................... | B65H 29/22 |
| | | | | 271/306 |
| 2017/0308027 A1* | 10/2017 | Tanaka | ............... | H04N 1/00527 |
| 2019/0263616 A1* | 8/2019 | Fujiwara | ............. | B65H 3/0684 |
| 2020/0382674 A1* | 12/2020 | Matsumoto | ............ | H04N 1/121 |
| 2021/0037155 A1* | 2/2021 | Nakamura | ......... | H04N 1/00652 |

FOREIGN PATENT DOCUMENTS

| | | |
|---|---|---|
| JP | 761644 | 3/1995 |
| JP | 2000118845 | 4/2000 |
| JP | 2017151570 | 8/2017 |
| RU | 2321963 C1 | 4/2008 |

* cited by examiner

[Figure 1]
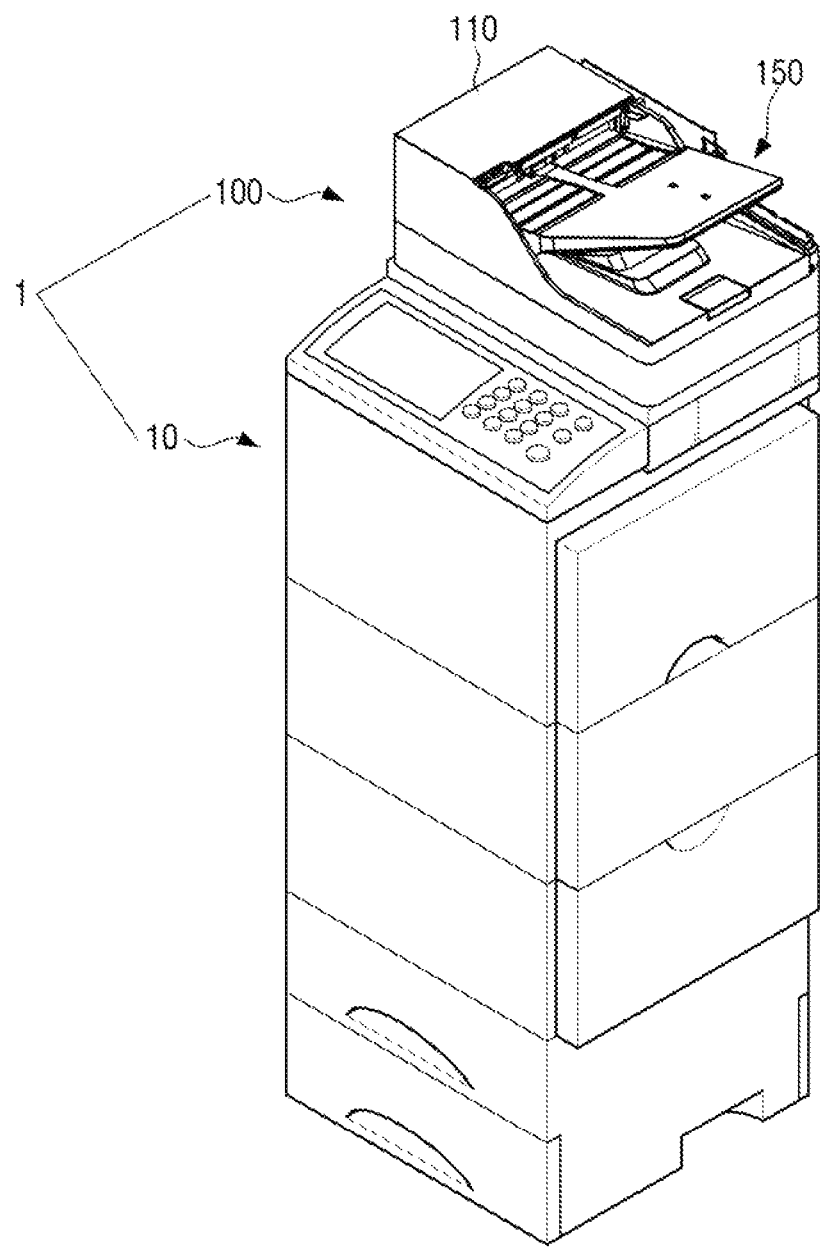

【Figure 2】
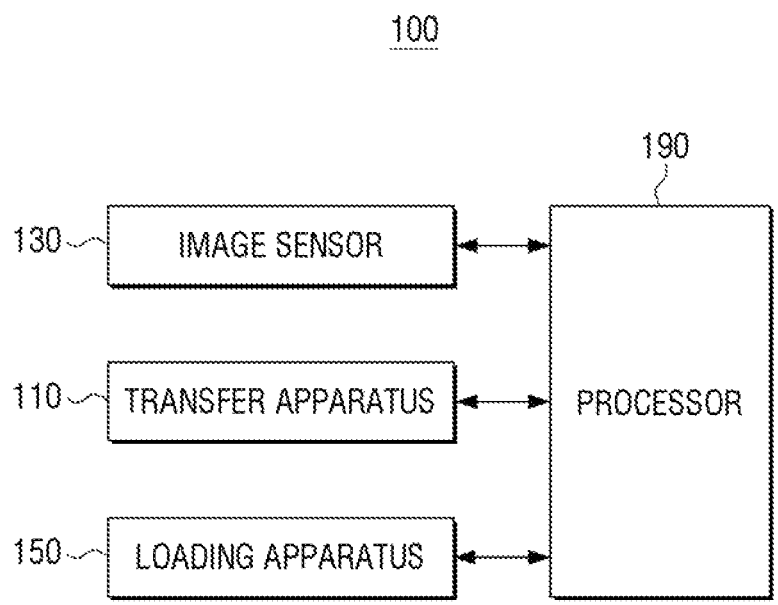
【Figure 3】
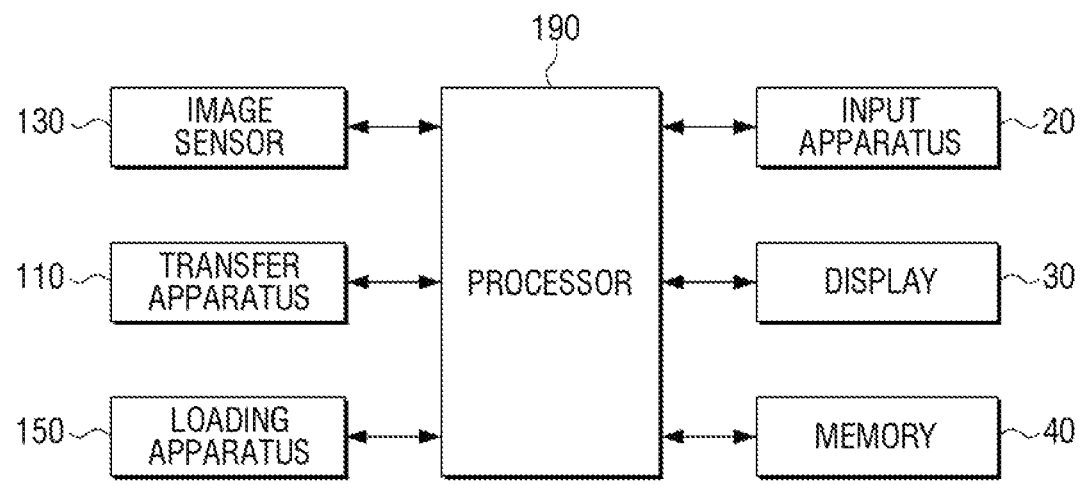

【Figure 4】
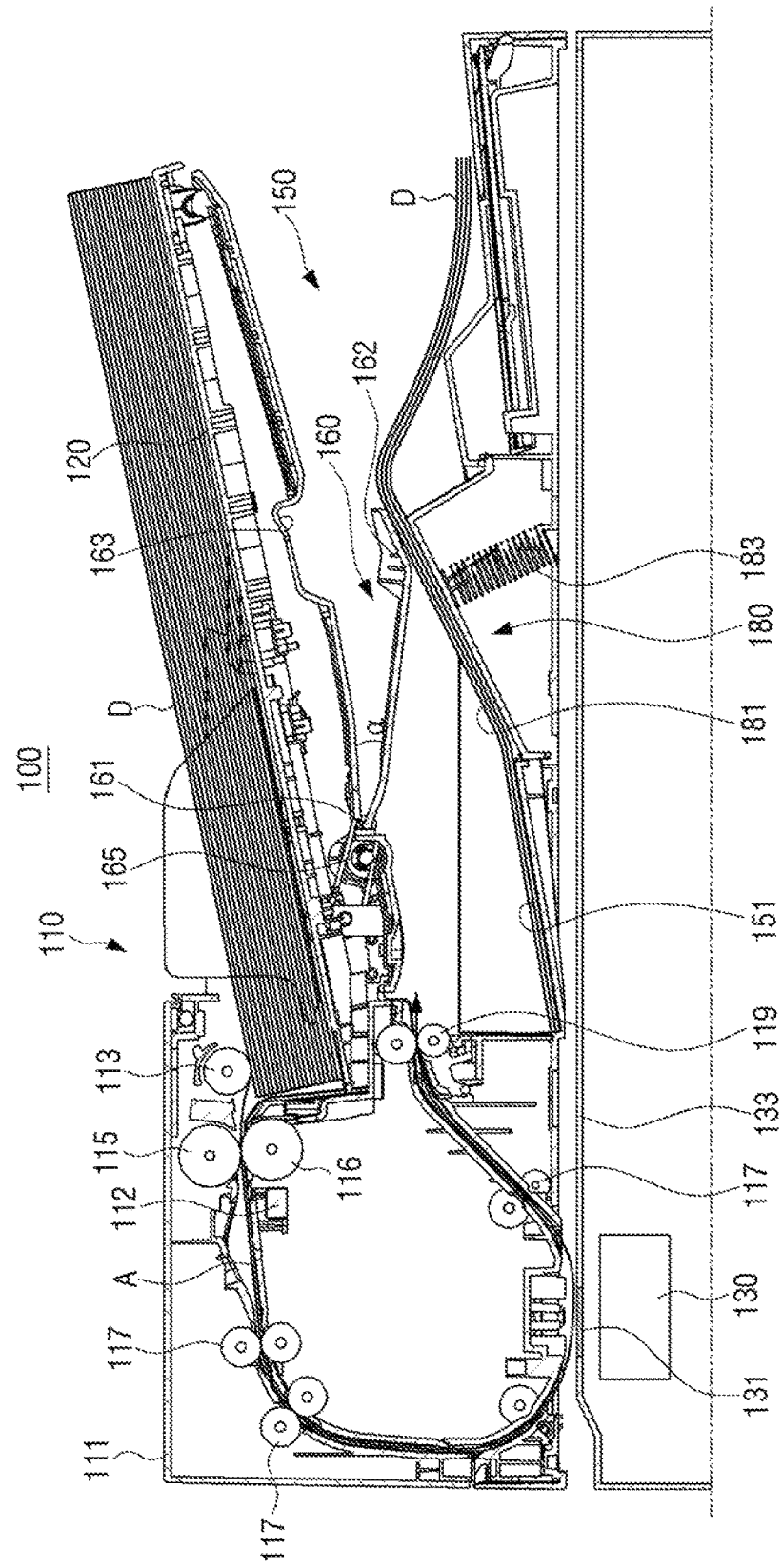

[Figure 5A]
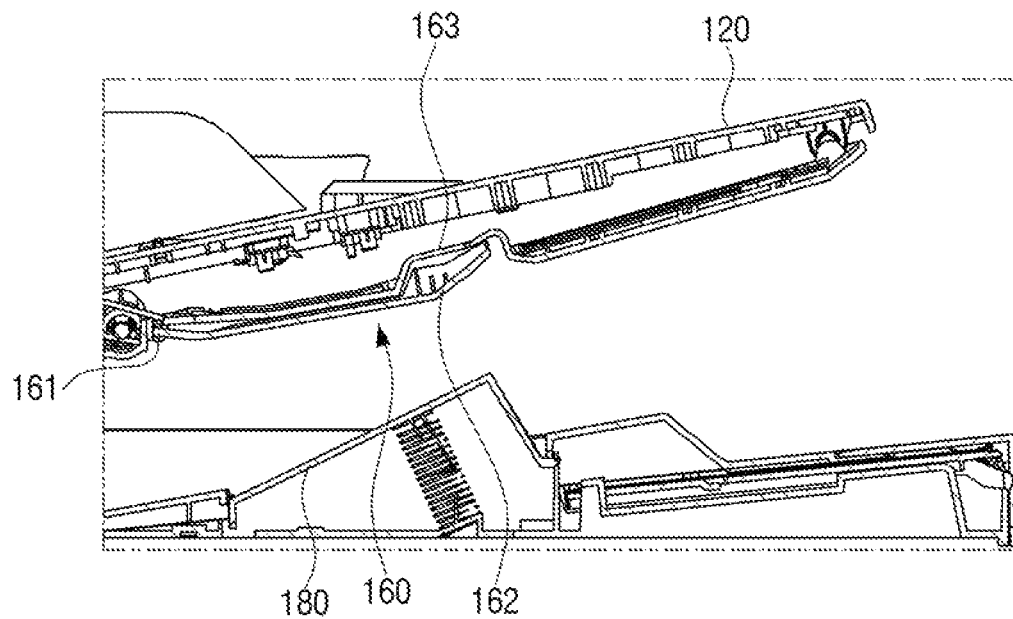
[Figure 5B]
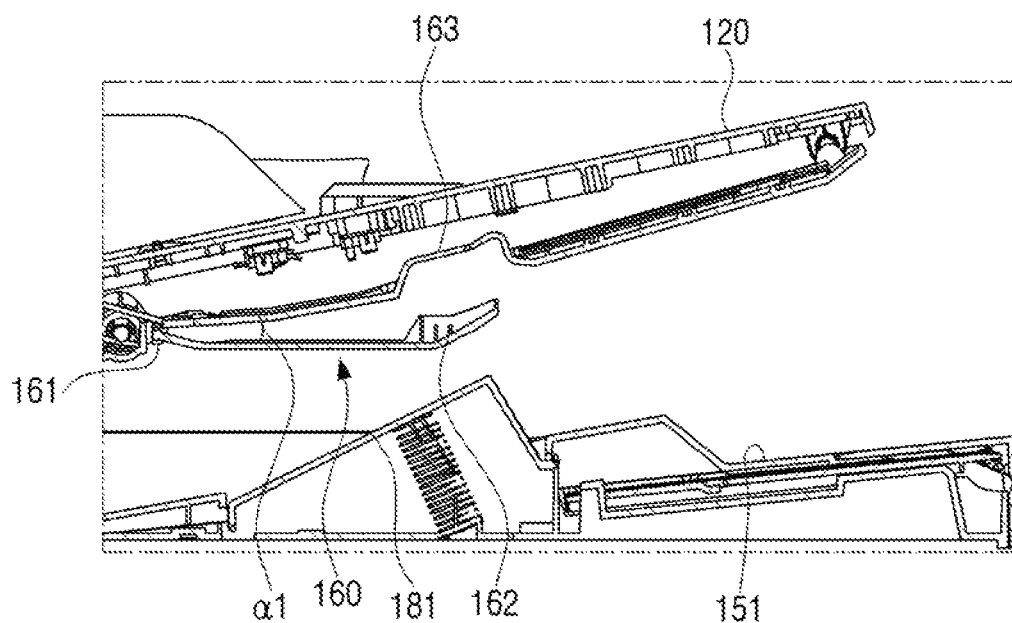

[Figure 5C]
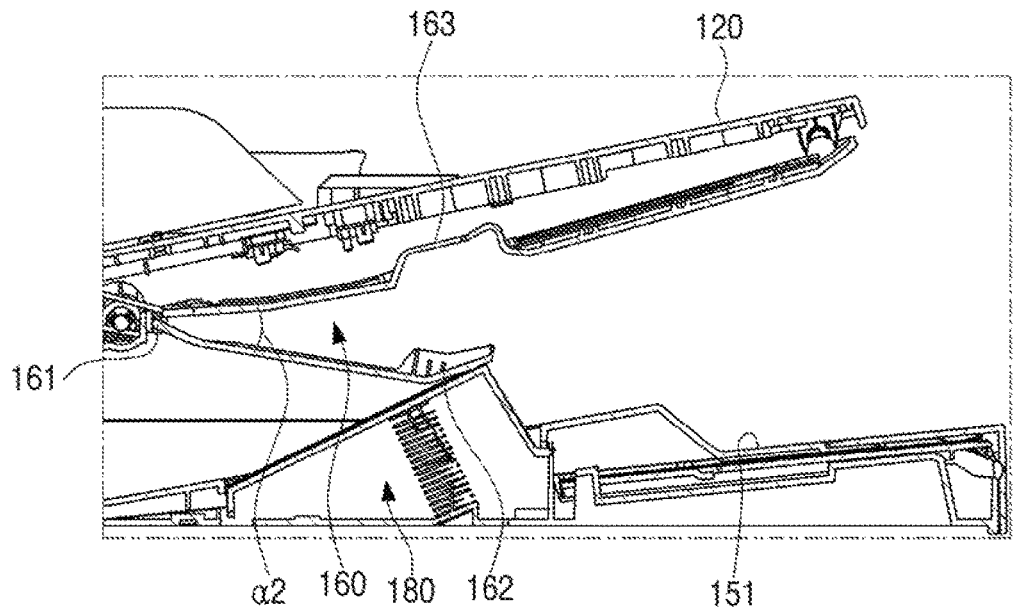
[Figure 6]
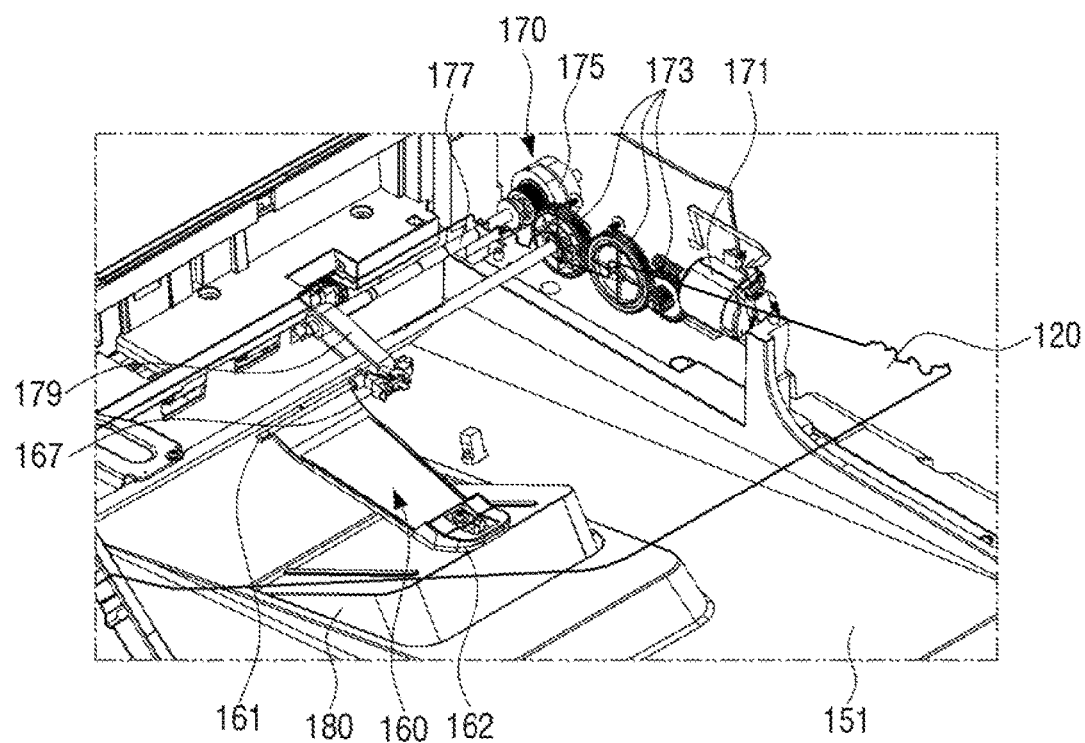

[Figure 7]
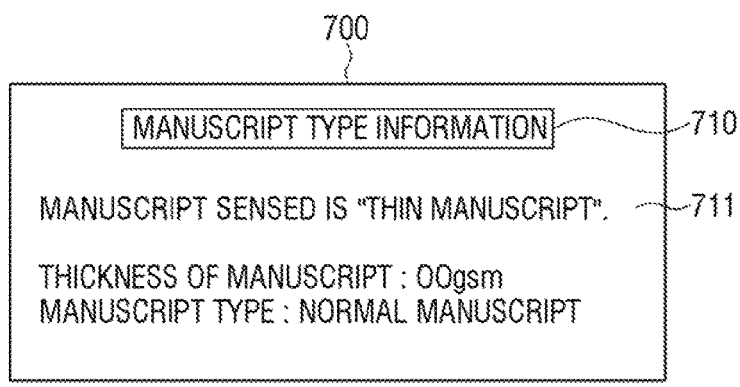
[Figure 8]
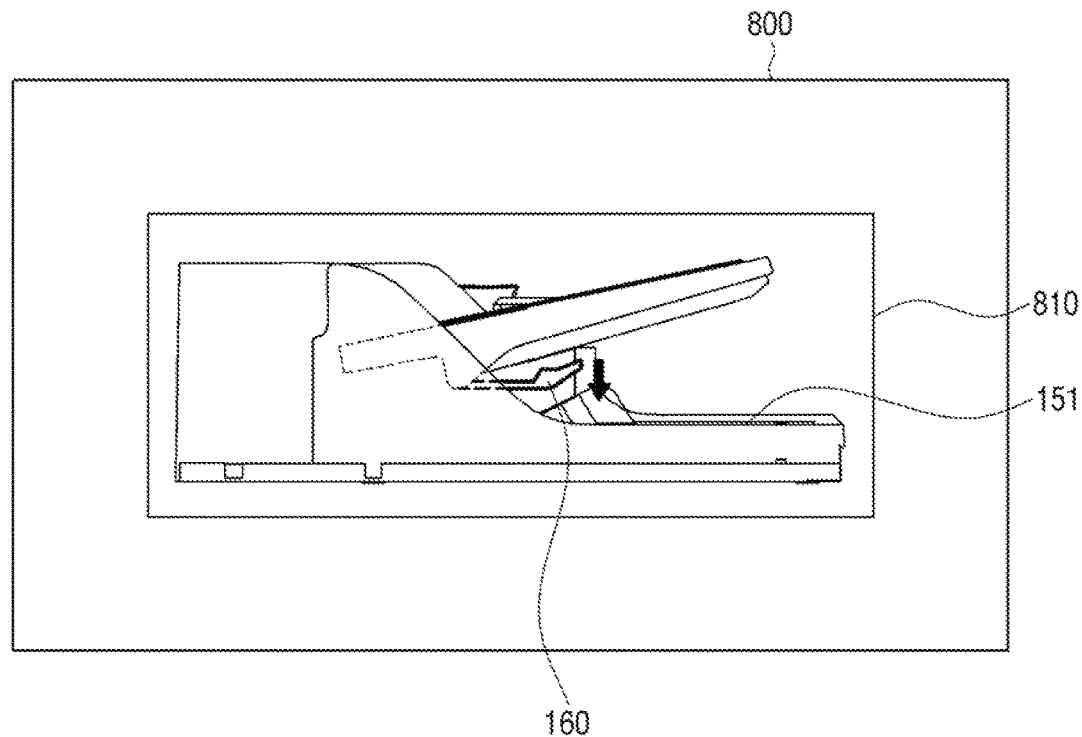

【Figure 9A】
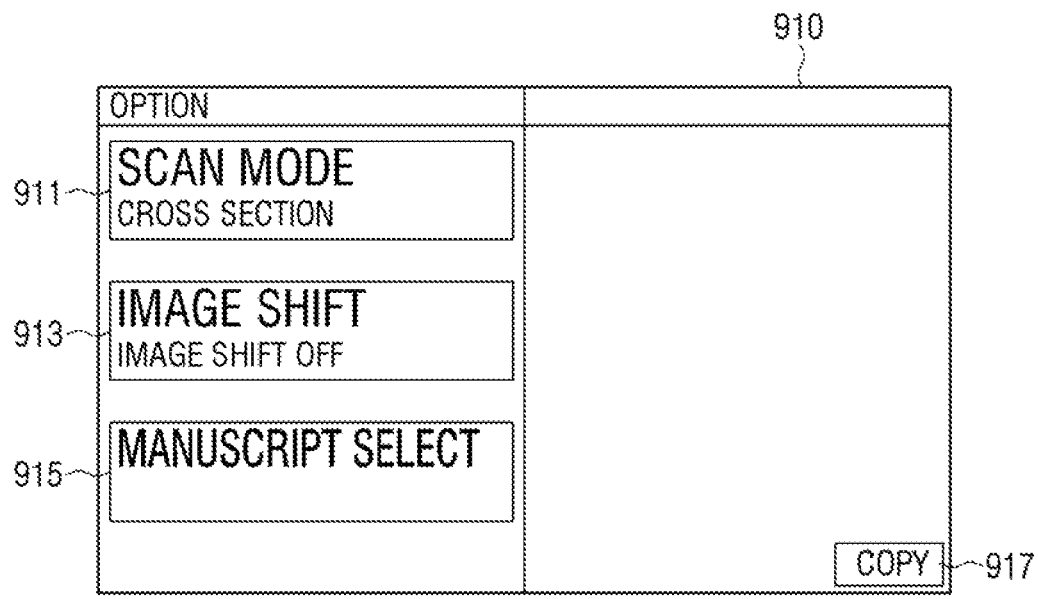
【Figure 9B】
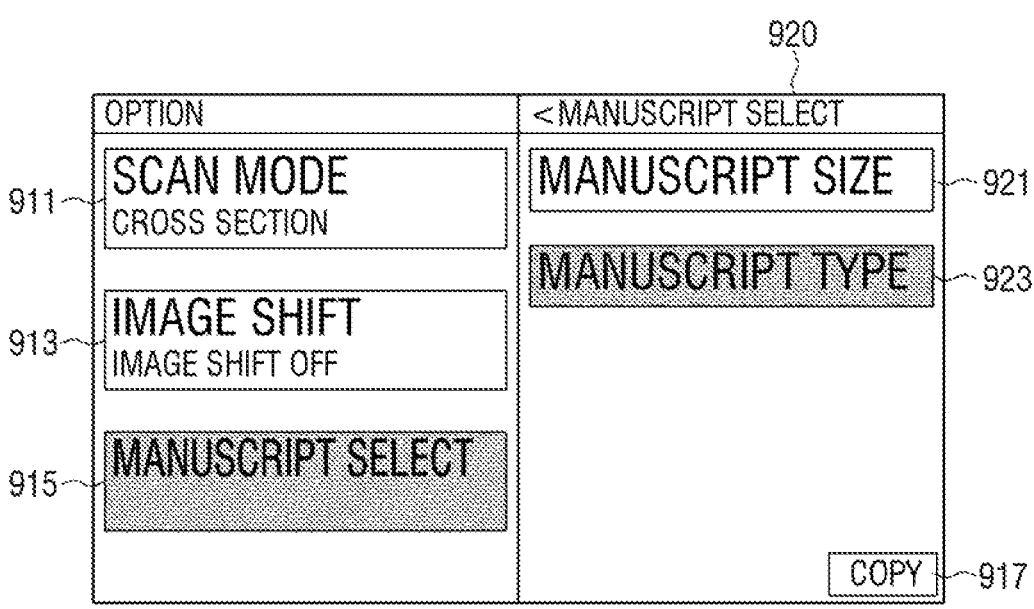

[Figure 9C]
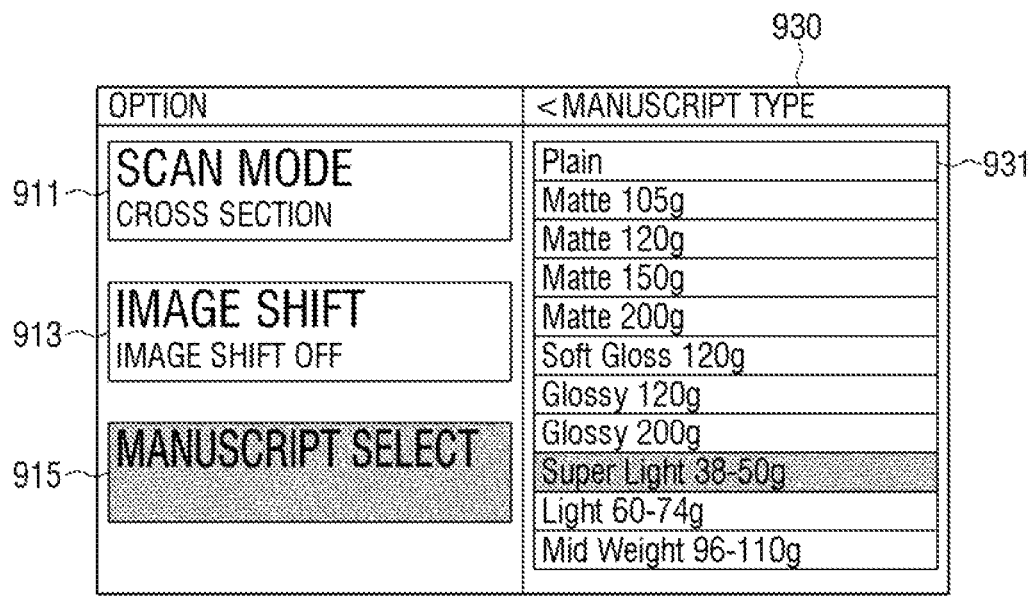
[Figure 9D]
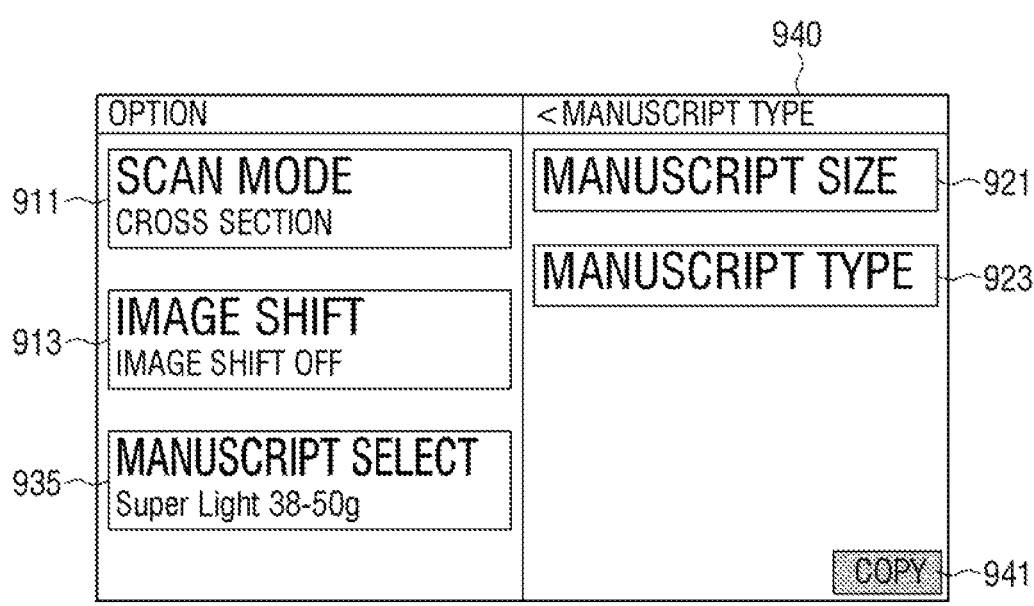

[Figure 10]
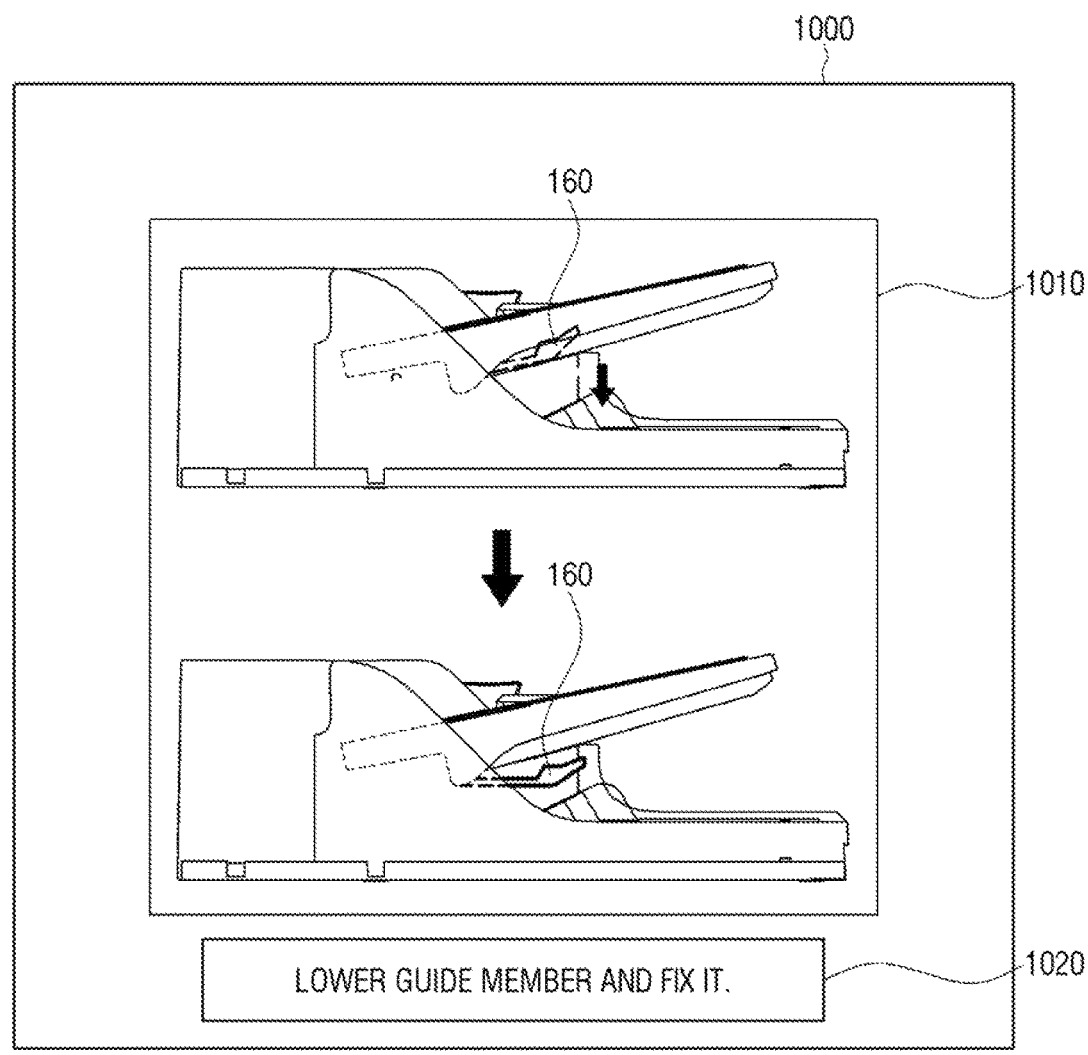

【Figure 11】
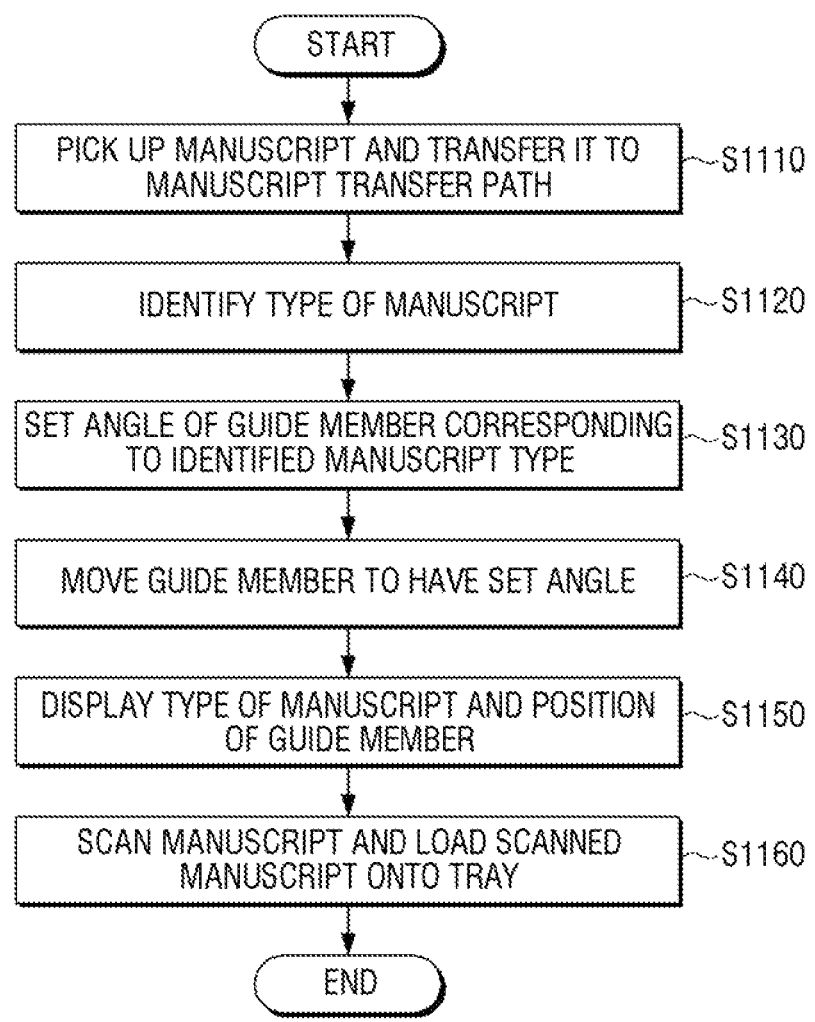

[Figure 12]
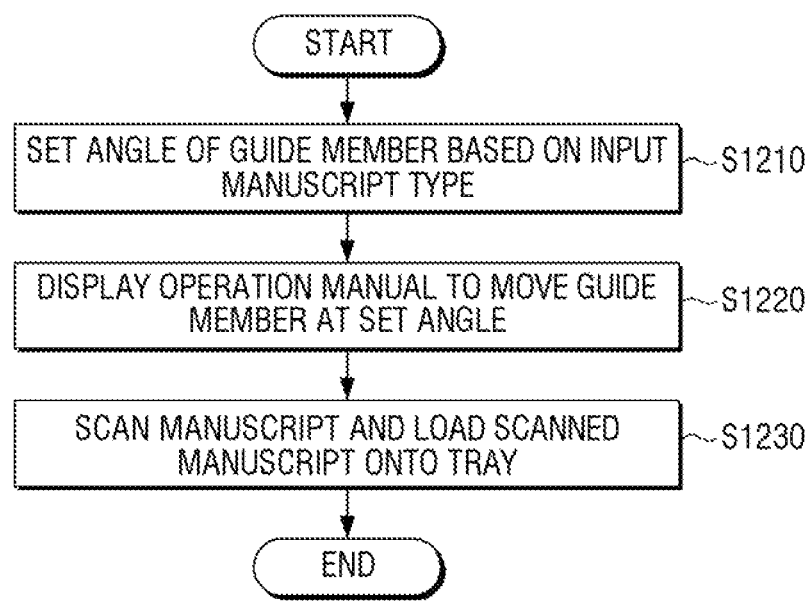

GUIDE ELEMENT FOR PAPER ALIGNMENT

CROSS REFERENCE TO RELATED APPLICATIONS

This application is a U.S. National Stage Application which claims the benefit under 35 U.S.C. § 371 of International Patent Application No. PCT/US2019/039253 filed on Jun. 26, 2019, which claims priority from Korean Application No. 10-2018-0076511 filed on Jul. 2, 2018, the contents of each of which are incorporated herein by reference.

BACKGROUND

An image scanning apparatus is an apparatus which performs generation, printing, reception, and transmission of image data, and representative examples thereof may be a printer, a copy machine, a facsimile, and a multifunction peripheral (MFP) in which functions of the above-described devices are combined.

The image scanning apparatus includes a loading apparatus in which a scanned manuscript is loaded.

BRIEF DESCRIPTION OF THE DRAWINGS

FIG. 1 is a perspective view illustrating an n image forming apparatus, according to an example;

FIG. 2 is a block diagram illustrating a brief configuration of an image scanning apparatus, according to an example;

FIG. 3 is a block diagram illustrating a detailed configuration of an image scanning apparatus, according to an example;

FIG. 4 is a cross-sectional view illustrating an image scanning apparatus, according to an example;

FIGS. 5A-5C are diagrams illustrating an operation of a guide member, according to various examples;

FIG. 6 is a diagram provided to explain a driving state of a guide member, according to an example;

FIGS. 7, 8, 9A, 9B, 9C, 9D and 10 are diagrams illustrating example user interfaces which are capable of being displayed on a display, according to various examples;

FIG. 11 is a flowchart illustrating an alignment method of a loading apparatus, according to an example; and FIG. 12 is a flowchart provided to explain an alignment method of a loading apparatus, according to another example.

DETAILED DESCRIPTION

Examples will be described below in greater detail with reference to the accompanying drawings. The examples described below may be modified and implemented in various different forms. In order to more clearly describe the features of the examples, a detailed description of known matters to those skilled in the art will be omitted.

Meanwhile, in the present disclosure, a case in which any one feature is connected with the other feature includes a case in which the features are directly connected with each other and a case in which the parts are electrically connected with each other with other features interposed therebetween. Further, when a certain feature is stated as "comprising" a certain feature, unless otherwise stated, this means that the certain feature may include another feature, rather than foreclosing the same.

The term "image forming job" as used herein may mean various jobs related to the image (e.g., printing, scanning or faxing), such as forming an image or creating/storing/transmitting an image file. In addition, "job" may mean an image forming operation but may also mean a series of processes necessary for performing an image forming operation.

In addition, an "image scanning apparatus" refers to an apparatus which scans an image of a manuscript and creates a scan image. An example of an image scanning apparatus includes a scanner, a copier, a facsimile and a multi function printer (MFP) that provides combined functionality of at least two of the single apparatuses. Meanwhile, in a case in which the image scanning apparatus is a copier, a facsimile, a multi function printer (MFP), etc. capable of performing an image forming job, the image scanning apparatus may be referred to as an image forming apparatus.

An image forming apparatus generally operates to print out print data generated at a terminal such as a computer onto a printing paper. An example of an image forming apparatus includes a copier, a printer, a facsimile and a multi function printer (MFP) that provides combined functionality of at least two of the single apparatuses. The image forming apparatus may refer to all apparatuses capable of performing an image forming operation, such as a printer, a scanner, a fax machine, an MFP, a display apparatus, or the like.

In addition, "hard copy" may refer to an operation of outputting an image on a printing medium such as paper, and the like, and "soft copy" may refer to an operation of outputting an image in a display apparatus, such as TV, monitor, and the like.

In addition, "content" may refer to all types of data that are subject to an image forming operation, such as photo, image, document file, or the like.

In addition, "print data" may refer to data that is converted into a format printable in a printer. Meanwhile, if a printer supports direct printing, the file itself may be print data.

In addition, "scan data" may refer to a scan image generated in a scan part, which may be a black and white image or a color image, and have a file format of various forms (e.g., BMP, JPG, TIFF, PDF, etc.)

In addition, "user" may refer to a person who performs an operation related to an image scanning operation using an image forming apparatus or a device connected to the image scanning apparatus via wire or wirelessly. In addition, "manager" may refer to a person who has the authority to access all functions and the system of the image scanning apparatus. The "manager" and the "user" may be the same person.

FIG. 1 is a perspective view illustrating an image forming apparatus, according to an example.

Referring to FIG. 1, a multi function printer (MFP) includes an image forming apparatus 10 forming an image on a print medium and an image scanning apparatus 100 disposed on an upper side of the image forming apparatus 100 and scanning the image scanning apparatus 100 scanning a manuscript.

The image forming apparatus 10 may print a manuscript scanned in the image scanning apparatus 100 or print data received from an external apparatus.

The image scanning apparatus 100 scans a manuscript to generate a scan image. In detail, the image scanning apparatus 100 includes an image sensor 130 scanning an image from a manuscript, a transfer apparatus picking up a manuscript and moving the manuscript to a manuscript transfer path (A, see FIG. 4), and a loading apparatus 150 loading a manuscript scanned in the image sensor 130 (see FIG. 2). The detailed configuration and operation of the image scanning apparatus 100 will be described later with reference to FIGS. 2-4.

As described above, in a multi function printer (MFP) 1 according to an example, the image forming apparatus 10 and the image scanning apparatus 100 are coupled to each other, and thus, in addition to a print job and a scan job, it is possible to support a copying function to immediately print a scanned manuscript.

However, in a process in which a manuscript discharged into a loading apparatus on a manuscript transfer path of the image scanning apparatus 100, a manuscript push phenomenon or a manuscript scattering phenomenon occurs and thereby, arrangement of loaded manuscript may be poor.

FIG. 2 is a block diagram illustrating a brief configuration of an image scanning apparatus 100, according to an example.

Referring to FIG. 2, the image scanning apparatus 100 includes the image sensor 130, a transfer apparatus 110, a loading apparatus 150, and a processor 190.

The image sensor 130 scans manuscript. For example, the image sensor 130 may scan image information of a manuscript from a light reflected from the manuscript. The image sensor 130 may include a charge coupled device (CCD) which is disposed in a row in a scanning direction or a plurality of CMOS image sensors (CIS).

The transfer apparatus 110 may transfer a loaded manuscript to a manuscript transfer path, and discharge the manuscript for which scanning is completed to the loading apparatus 150. The detailed configuration and operation of the transfer apparatus 110 will be described later with reference to FIG. 4.

The processor 190 may control the respective elements in the image scanning apparatus 100. For example, the processor 190 may be implemented as a CPU, an ASIC, etc., and when a scan command is received from a user, the processor 190 may control the transfer apparatus 110 and the image sensor 130 to scan the loaded manuscript. The scan command may be received through an input apparatus 20 provided in the image scanning apparatus 100, or may be received through a communication interface (not illustrated) from an external apparatus (e.g., a PC, a smartphone, etc.)

In addition, the processor 190 may identify a type of manuscript. For example, the processor 190 may identify a type of manuscript based on a signal sensed by a manuscript sensor 112 which will be described below. In an implementation, the processor 190 may use information about a type of manuscript set by a user.

The type of manuscript may be classified according to characteristics, such as a material, thickness and weight of the manuscript, etc. For example, the type of manuscript may be a manuscript exclusive for inkjet printers, an OHP manuscript, a normal manuscript according to a thickness of manuscript, a recycled manuscript, and the like.

For example, the type of manuscript may be classified according to the thickness of manuscript. When the thickness of manuscript is within a predetermined thickness range, the processor 190 may identify that the manuscript is a "normal manuscript". When the thickness of manuscript is less than the lower limit of a predetermined thickness range, the processor 190 may identify that the manuscript is a "thin manuscript". When the manuscript is thicker than the upper limit of a predetermined thickness range, the processor 190 may identify that the manuscript is a "thick manuscript".

The type of manuscript is classified into the normal manuscript, the thin manuscript, and the thick manuscript, but is not limited thereto, and may be classified into a plurality of manuscript types by applying a subdivided thickness range. In addition, the type of manuscript is classified according to the thickness of the manuscript, but is not limited thereto, and the manuscript may be classified according to characteristics, such as a weight or material of the manuscript, and the like.

The processor 190 may set an angle ($\alpha$) of a guide member based on an identified manuscript type.

For example, the processor 190 may set an angle formed by the guide member 160 and a discharge tray 151 based on the identified manuscript type. As described above, the processor 190 may adjust the degree of contact between the manuscript loaded on the discharge tray 151 and the guide member 160 by adjusting the angle of the guide member 160.

The angle of the guide member 160 may refer to an angle formed by the guide member 160 and the discharge tray 151. However, for convenience of explanation, it will be described below that an angle ($\alpha$) of the guide member 160 is an angle between the feed tray 120 and the guide member 160.

The guide member 160 may apply a load from an upper side of the manuscript discharged into the discharge tray 151 to manuscript (D), increases a frictional force between manuscripts, and align the manuscript.

In a case in which the manuscript is thinner than a predetermined thickness, the processor 190 may set the angle ($\alpha$) of the guide member 160 such that the guide member 160 does not come into contact with the manuscript (D). In detail, the processor 190 may set an angle (a) of the guide member 160 small so that the guide member does not interrupt the process of manuscript. The guide member 160 moving to the set angle ($\alpha$) of the guide member may be located such that it does not come into contact with the manuscript being discharged.

The guide member 160 is not in contact with the manuscript and thus, the straightness of the discharged manuscript D can be maintained and thus, the manuscript may go straight to a discharge location of the discharge tray 151.

That is, the manuscript is blocked by the guide member 160 and does not stop at a distance shorter than the discharge location, so that the discharged manuscript may go straight to the discharge location. Thereby, a rolling phenomenon of the manuscript does not occur and the manuscript can be regularly aligned.

In a case in which the manuscript is a "thick manuscript", since the straightness of manuscript is large, the processor 190 may move the guide member 160 downwardly toward the manuscript to increase a frictional force between the manuscripts.

In a case in which the manuscript is thicker than a predetermined thickness, the processor 190 may set the angle ($\alpha$) of the guide member 160 such that the guide member 160 comes into contact with the manuscript D and provides a frictional force to the manuscript. In detail, the processor 190 may set the angle ($\alpha$) of the guide member 160 larger than a thin manuscript so that the guide member 160 applies a frictional force to the manuscript and align the manuscript.

The guide member 160 moving to the set angle ($\alpha$) of the guide member may be located such that it comes into contact with the manuscript being discharged. The manuscript D is brought into contact with the guide member 160 to increase the contact area, and the manuscript D can be stacked on the discharge tray 151 in a state in which the manuscript does not scatter.

The processor 190 may control the guide member 160 to be positioned at an angle ($\alpha$) which is set based on a type of manuscript.

The processor 190 may display an operation manual of the guide member 160 to a user so that the guide member 160 has an angle which is set based on the type of manuscript.

The guide member 160 may be automatically or manually positioned at a predetermined angle which is determined based on the manuscript type.

The processor 190 may, at the time of initial operation, set the angle of the guide member 160 so that the guide member 160 positioned at an initial position has an angle corresponding to the type of manuscript, and when a scan job is completed, reset the angle ($\alpha$) of the guide member so that the guide member 160 of the predetermined angle returns to the initial position.

The processor 190 may identify whether the guide member 160 is positioned at the initial position.

It is described above that one of the image sensor 130 is disposed in the image scanning apparatus 100. However, if the image scanning apparatus 100 is an apparatus capable of duplex document scanning, a plurality of image sensors may be disposed in the image scanning apparatus 100. In addition, in a case in which the image scanning apparatus 100 is capable of scanning of a flatbed type, an image sensor disposed at a lower end of a flatbed 133 (see FIG. 4) may be further disposed.

Meanwhile, although the above illustrates and explains the simple constitution of the image scanning apparatus, various new units may be additionally included in actual implementation. This will be described below with reference to FIG. 3.

Referring to FIG. 3, the image scanning apparatus 100 includes an image sensor 130, the transfer apparatus 110, the loading apparatus 150, the processor 190, the input apparatus 20, a display 30, and a memory 40.

Since the operations of the image sensor 130, the transfer apparatus 110, the loading apparatus 150, and the processor 190 have been described above with reference to FIG. 2, an overlapped description will be omitted.

The input apparatus 20 may receive input of a selection of function and a control command for the corresponding function from a user. The input apparatus 20 may be implemented as a plurality of buttons, a keyboard, a mouse, etc., and may also be implemented as a touch screen capable of simultaneously performing the functions of the display 30 described above.

The input apparatus 20 may receive input of information about the type of manuscript from a user. For example, the input apparatus 20 may receive input of information about a thickness, material and type of the manuscript, and directly receive input of the type of manuscript.

The display 30 may display various information provided from the image scanning apparatus 100. The display 30 may display a user interface window to select various functions provided by the image scanning apparatus 100. The display 30 may be a monitor such as an LCD, CRT, OLED, and the like, and may also be implemented as a touch screen which is capable of simultaneously carrying out the functions of the input apparatus 20.

In addition, the display 30 may display a user interface window for receiving a setting related to the type of manuscript. The display 30 may display information about an identified manuscript type, and display information about a location of the guide member 160 according to the manuscript type.

In addition, the display 30 may display a state of the guide member 160 positioned to have the angle ($\alpha$) of the guide member 160 set according to the type of manuscript.

In addition, the display 30 may display an operation manual of the guide member 160 for manipulating the guide member 160 to have a set angle. A user may manipulate a position of the guide member 160 through the displayed operation manual. The display 30 may display the manipulated position of the guide member 160.

The memory 40 may store data for image processing. In addition, the memory 40 may store data regarding the angle of the guide member 160 corresponding to the type of manuscript.

The processor 190 may search the memory 40 for the type of manuscript which matches with a signal detected from the manuscript sensor 112 and identify the type of manuscript. In addition, the processor 190 may search the memory 40 for the angle of the guide member according to the type of manuscript matching with the identified manuscript type and set the angle of the guide member 160 corresponding to the type of manuscript.

The memory 40 may be implemented by a storage medium in the image scanning apparatus 100 or an external storage medium, for example, a removable disk including a USB memory, a storage medium connected to a host, or a web server through a network.

As described above, the image scanning apparatus 100 according to an example may move a position of the guide member 160 for aligning the manuscript according to the type of manuscript and discharge various manuscripts from the thin manuscript to the thick manuscript in an aligned state.

FIG. 4 is a cross-sectional view illustrating the image scanning apparatus 100, according to an example.

Referring to FIG. 4, the transfer apparatus 110 includes a main body 111 and a feed tray 120 which is installed on one side of the main body 111 and has a manuscript to be scanned inside. A manuscript transfer path A to which a manuscript of the feed tray 120 is transferred is provided in the main body 111. A pick up roller 113, a feed roller 115, an ADF roller 116, a plurality of transfer rollers 117, and a discharge roller 119 may be provided in the manuscript transfer path A.

A manuscript loaded onto the feed tray 120 may be transferred along the manuscript transfer path A and scanned in the image sensor 130. The scanned manuscript may be discharged from the manuscript transfer path A into the loading apparatus 150.

The loading apparatus 150 loads the manuscript discharged from the manuscript transfer path A, which includes a discharge tray 151 on which the discharged manuscript is stacked and the guide member 160 for aligning the discharged manuscript.

The discharge tray 151 on which a manuscript D passing through the manuscript transfer path A and discharged by the discharge roller 119 is provided in the loading apparatus 150.

In general, the discharge tray 151 may be disposed to be down-sloped toward the discharge roller 119.

A front end part of the manuscript D escaping from the discharge roller 119 may be extended into air to a certain extent by rigidity of the manuscript D and bent downward, and come into contact with the discharge tray 151 or another one of the manuscript D discharged in advance and stacked. From this point, the manuscript D may overcome friction with the discharge tray 151 or the manuscript D, and may be continuously discharged according to rotation of the discharge roller 119. When an end part of the manuscript D escapes from the discharge roller 119, the manuscript D is thrown toward the discharge tray 151 at a liner velocity by rotational force of the discharge roller 119. In this case, the manuscript D is normally discharged farther than its length, is applied with pressure by the guide member 160 disposed at an upper part of the discharge tray 151, and is slid down to the discharge tray 151 and stacked.

In order for the manuscript D in the loading apparatus 150 to be evenly stacked on the discharge tray 151, it may be necessary for the discharged manuscript D that a component of a force for the discharge tray 151 due to a weight of the manuscript D should be larger than a frictional force between the members of the manuscript D and the manuscript D or between the manuscript D and the discharge tray 151.

The frictional force may differ depending on the type of manuscript.

Accordingly, the guide member 160 for applying a frictional force to the manuscript may be moved to a position to have the angle ($\alpha$) of the guide member corresponding to the type of manuscript.

The manuscript sensor 112 may sense a picked-up manuscript to thereby sense whether the manuscript pick up has been normally performed. The manuscript sensor 112 may be positioned in the vicinity of an ADF roller 116.

Whether the manuscript pick up is normally performed may be identified based on whether the manuscript is sensed by the manuscript sensor 112. When the manuscript is sensed by the manuscript sensor 112, it may be identified that the manuscript pick up has been normally performed.

The manuscript sensor 112 may sense whether a manuscript is picked up as well as information about the type of manuscript. The manuscript sensor 112 may include a sensor which is capable of sensing a characteristic of the manuscript, such as a thickness, weight, material, gloss, etc. of the manuscript, which is information to identify the type of manuscript.

Accordingly, a signal sensed by the manuscript sensor 112 may reflect characteristics such as a material, thickness, etc. of the manuscript.

According to the signal sensed by the manuscript sensor 112, the processor 190 may identify the type of manuscript for controlling the guide member 160. An angle of the guide member 160 corresponding to the type of manuscript identified by the signal sensed by the manuscript sensor 112 may be set. The guide member 160 may move its position to have the set angle.

The manuscript sensor 112 may sense a thickness of the manuscript. The processor 190 may identify the type of manuscript according to the sensed thickness of the manuscript D. A manuscript, if within a predetermined thickness range, may be identified as a "normal manuscript", if thinner than the lower limit of the predetermined thickness range, may be identified as a "thin manuscript", and if thicker than the upper limit of the predetermined thickness range, may be identified as a "thick manuscript".

The discharge roller 119 discharging the manuscript for which scanning has been completed may be disposed at a downstream of the image sensor 130. The discharge roller 119 may include a driving roller and a driven roller which are rotated as being engaged with each other. The manuscript for which scanning has been completed may pass through the discharge roller 119, and may be discharged into the loading apparatus 150 and stacked.

The loading apparatus 150 may be provided on a lower side of the feed tray 120, which may stack a plurality of manuscripts discharged from an image scanning apparatus. The loading apparatus 150 includes the discharge tray 151 on which the discharged manuscript is stacked and the guide member 160 for aligning the discharged manuscript.

When the manuscript discharged from the manuscript transfer path A is stacked on the discharge tray 151 by a certain amount, pressure may be applied by the guide member 160. The guide member 160 may prevent the manuscript from moving back and forth and left and right as it falls to the discharge tray 151 by using a frictional force with respect to the discharged manuscript. The guide member 160 may apply a load from an upper side of the manuscript to the manuscript, increase a frictional force between manuscripts, and align the manuscripts.

The guide member 160 may be rotatably disposed on an upper side of the discharge tray 151.

One end 161 of the guide member 160 may be rotatably hinge-connected to a lower side of the feed tray 120, and between the guide member 160 and the feed tray 120, a spring (not illustrated) for elastically supporting the guide member 160 when the guide member 160 is rotated may be mounted.

The guide member 160 may rotate and move at an automatically set angle by a driving member 170 (see FIG. 6) which will be described later, and maintain a fixed state at the set angle. In addition, the guide member 160 may move to have the angle ($\alpha$) of the guide member 160 set through a simple operation of a user.

In a state in which the guide member 160 is rotatably moved by the set angle and fixed at the set angle, the guide member 160 includes a fixing member 165 which is capable of maintaining a position of the guide member 160.

By rotating the guide member 160 and appropriately adjusting the hinge-connected one end 161, the angle ($\alpha$) of the guide member may be adjusted. In addition, using the fixing member 165, the guide member 160 may be stably fixed to a position having the angle ($\alpha$) of the guide member 160.

The fixing member 165 may be provided at one end 161 of the guide member 160. One end 161 of the guide member 160 may be rotatably hinge-connected to the discharge tray 120. One end 161 of the guide member may include a prominence and depression part which is formed at predetermined angular intervals along a circumference direction.

The fixing member 165 may include a groove part which is capable of contacting a prominence and depression part. The groove part of the fixing member 165 may be slidably engaged with the prominence and depression part of the guide member 160. The groove may be formed in a radiation direction to correspond to the prominence and depression part on a cross section of the fixing member 165. The groove part of the fixing member 165 may be engaged with the prominence and depression part and suppress rotation of the guide member 160. In the example described above, the fixing member 165 has a groove part, but is not limited thereto. The fixing member 165 may be formed so as to fix the guide member 160 at predetermined angular intervals.

The guide member 160 may be fixed at an angle set according to the type of manuscript by the fixing member 165 and align the discharged manuscript.

The processor 190 may search the memory 40 for the angle of the guide member according to the type of manuscript matching with the identified manuscript type and set the angle ($\alpha$) of the guide member corresponding to the type of manuscript.

The angle ($\alpha$) of the guide member 160 may be varied to correspond to the type of manuscript, and a degree of contact between the guide member 160 and the manuscript and whether the guide member 160 is in contact with the manuscript may be identified according to the angle (α) of the guide member.

The other end 162 of the guide member 160 may apply pressure to an upper side of a plurality of manuscripts D stacked on the discharge tray 151 to thereby align the manuscripts D. The other end 162 of the guide member 160 may include an inclination surface which is upward-sloped, so that a front end of the manuscript is not rolled by the guide member 160. The inclination surface formed at the other end 162 of the guide member may be formed to have a slope corresponding to a slope of an inclination member 180 which will be described later.

The loading apparatus 150 includes the inclination member 180.

The inclination member 180 is disposed on the discharge tray 151, and may be inclined upward to extend in the upward direction with respect to the discharge tray 151. The inclination member 180 may provide a frictional force on a rear surface of the discharged manuscript so that the manuscript is aligned.

According to a distance from the discharge roller 119 to a space between a discharge part from which the manuscript is discharged and an upper surface of the discharge tray 151, the manuscript may do a free fall by gravity. An inclined upper end of the inclination member 180 may be formed at a height corresponding to the discharge part from which the manuscript is discharged.

By the inclination member 180 protruded from the discharge tray 151, a vertical distance between the discharge part and the discharge tray 151 may be reduced. Accordingly, an air resistance hardly applies to the manuscript D discharged from the discharge roller 119 and does a free fall and thus, the discharged manuscript may be stacked on the discharge tray 151 in an unscattered state.

As a front end of the discharged manuscript is mounted on an inclined surface of the inclination member 180, a larger frictional force than an air resistance applied to the discharged manuscript is applied and thus, the discharged manuscripts may be steadily aligned on the discharge tray 151 without being scattered.

The inclination member 180 includes a resilient member 183 therein. The resilient member 183 may be fixed on an inner side of the inclination member 180, and support the inclination member 180 to an upper direction. The resilient member 183 may be compressed by a weight of manuscript stacked on the discharge tray 151. It may be configured such that a compression displacement is generated in proportion to the number of pages of manuscript stacked on the discharge tray 151.

FIGS. 5A-5C are diagrams illustrating operations of the guide member 160, according to various examples;

FIG. 5A illustrates an initial operation state of the guide member 160. At the time of initial operation of the image scanning apparatus 100, the guide member 160 may be positioned at an initial position at which the guide member 160 is contained in the feed tray 120. On the rear side of the feed tray 120, a contain groove 163 in which the guide member 160 may be contained may be formed.

FIGS. 5B and 5C illustrate a state in which the guide member 160 has moved its position to have an angle of the guide member 160 corresponding to the type of manuscript.

Referring to FIG. 5B, in a case in which the discharged manuscript is a thin manuscript, an angle of the guide member may be set to be less than that of the normal manuscript or the thick manuscript. An angle (α1) of the guide member may be set such that the discharged manuscript is not in contact with the other end of the guide member 160. The guide member 160 may be rotatably moved in a direction having the angle (α1) of the guide member. While the manuscript is scanned, the guide member 160 may be fixed at a position having the set angle (α1) corresponding to the type of manuscript.

The guide member 160 may fixed at an angle (α1) which is set according to the type of manuscript during a scan job, and when the scan job is completed, the guide member 160 may return to the initial position as illustrated in FIG. 5A.

Referring to FIG. 5C, the guide member 160 may be positioned to apply pressure to an upper end of the manuscript. The guide member 160 may be rotated toward an outer side of the feed tray 120 to have an angle (α2) of the guide member 160 corresponding to the type of manuscript.

In a case in which the discharged manuscript is a normal manuscript or a thick manuscript, the angle (α2) of the guide member 160 may be set such that the other end 162 of the guide member is in contact with the manuscript D.

The guide member 160 may be rotated and fixed at a position having the set angle (α2) of the guide member. The guide member 160 which has moved may apply pressure to a bundle of manuscripts stacked on the discharge tray 151. In this case, the manuscript discharged to the discharge tray 151 may be aligned by the guide member 160.

The guide member 160 may be fixed at the angle (α2) which is set according to the type of manuscript during the scan job, and when the scan job is completed, the guide member 160 may return to the initial position as illustrated in FIG. 5A.

FIG. 6 is a diagram provided to explain a driving state of the guide member 160, according to an example.

Referring to FIG. 6, the image scanning apparatus 100 according to an example may further include a driving member 170 adjusting an angle of the guide member 160.

The driving member 170 includes a rotation axis 177 which is rotated by a driving force of the driving motor 171, a clutch 175 which controls the rotation axis 177 to selectively rotate it according to a driving direction of the driving motor 171 so that the guide member 160 connected to the rotation axis 177 is driven, and a plurality of gears 173 which transfer a driving force of the driving motor 171 to the one-way clutch 175.

The driving motor 171 is provided to elevate the feed tray 120, which may use a driving force of the driving motor 171 to move a position of the guide member 160 through the plurality of gears 173.

The guide member 160 is configured to be connected to a driving motor 171 through the plurality of gears 173 interlocked with each other, and such that the plurality of gears 173 are driven by a normal and reverse rotation of the driving motor and operate the guide member 160.

A driving force of the driving motor 171 may be transferred to the rotation axis 177 by the plurality of gears 173. The rotation axis 177 may be rotated by selectively receiving a driving force of the driving motor 171 through the clutch 175.

The guide member 160 may be connected to the rotation force 177 and a belt 179. The guide member 160 may be rotated by a rotational force of the rotation axis 177. When the rotation axis 177 is rotated, the guide member 160 may be rotatably moved toward a direction of the discharge tray 151.

According to the type of discharged manuscript, the driving member 170 may rotate the guide member 160 to have the set angle (α) of the guide member.

The driving member 170 may operate the driving motor 171 and the clutch 175 so that the guide member 160 has a set inclination angle corresponding to the type of manuscript, and rotate the rotation axis 177 for a predetermined time.

In addition, the loading apparatus 150 according to an example may be provided with a guide member sensor 167 so that a position of the guide member 160 in operation may be determined and identified.

The guide member sensor 167 may identify whether the guide member 160 is positioned in the contain groove 163. When a scan job ends, the guide member 160 may be contained in the contain groove 163 which is the initial position. It may be identified whether the guide member 160 is positioned at the initial position based on a signal sensed in the guide member sensor 167. In FIG. 6, it is described that the guide member 160 is automatically moved by the driving member 170, but the example is not limited thereto. The guide member 160 may be manually moved. A user interface window which is capable of being displayed on the display 30 of the image scanning apparatus 100 in a case in which the guide member 160 is manually moved will be described below, with reference to FIG. 10.

FIGS. 7 and 10 are diagrams illustrating various example user interfaces which are capable of being displayed on a display, according to various examples.

In detail, FIG. 7 illustrates an example user interface window which is capable of being displayed in a case where it is not possible to identify a type of manuscript by the manuscript sensor 112. The image scanning apparatus 100 according to an example may automatically identify the type of manuscript which is scanned using the manuscript sensor 112.

Referring to FIG. 7, the user interface window 700 may include a manuscript type information area which shows manuscript type information and a message 711 which shows an identified manuscript type. The message 711 may include the type of manuscript, but may also include information such as a thickness, type, and the like of the manuscript.

FIG. 8 illustrates an example user interface window 800 which is capable of being displayed in a case where the guide member 160 is moved by the driving member 170. The image scanning apparatus 100 according to an example may position the guide member 160 at a position having an angle of the guide member 160 by the driving member 170.

Referring to FIG. 8, the user interface window 800 may display an image 810 of a guide member 160 of which a position has been moved. For example, the image 810 may be formed to show a position of the guide member 160 which has rotatably moved at a set angle of the guide member 160.

FIGS. 9A-9D illustrate example user interface windows which receive information about the type of manuscript. The image scanning apparatus 100 according to an example may manually receive information about the type of manuscript input by the input apparatus 20. The guide member 160 may be moved to an angle of a guide member corresponding to the received manuscript type.

Referring to FIG. 9A, the user interface window 910 may include a scan mode area 911, an image shift area 913, a manuscript selection area 915, and a copy area 917.

The scan mode area 911 is a selection area for selecting whether to perform a single-sided scanning or double-sided scanning of a manuscript. For example, in a case in which a single-sided scan is set in the scan mode area 911, the processor 190 may perform a single-sided scan operation with respect to the manuscript.

The image shift area 913 is a selection area for selecting whether to process a scanned image. For example, in a case in which an image shift off is selected in the image shift area 913, an operation to shift the scanned image may not be performed.

The manuscript selection area 915 is a selection area for selecting information about a manuscript. In a case in which the manuscript selection area 915 is selected, a user interface window as in FIG. 9B may be displayed.

The copy area 917 is a selection area for selecting whether to perform copying using a scan function with respect to a manuscript. In a case in which the copy function 917 is selected, a manuscript D may be copied using the scan function.

FIG. 9B illustrates an example user interface window 920 displayed when the "manuscript select" is selected.

Referring to FIG. 9B, the user interface window 920 includes a manuscript size area 921 and a manuscript type area 923. The manuscript size area 921 is a selection area for selecting a size of manuscript. The manuscript type area 923 is a selection area for selecting a type of manuscript. In a case in which the manuscript type area 923 is selected, a user interface window as in FIG. 9C may be displayed.

FIG. 9C illustrates an example user interface window 930 displayed when the "manuscript type" is selected.

Referring to FIG. 9C, the user interface window 920 may include a plurality of manuscript type areas 931 which are selectable.

For example, the manuscript type area 931 may display Plain, Matte 105 g, Matte 120 g, Matte 150 g, Matte 200 g, Soft Gloss 120 g, Glossy 120 g, Glossy 200 g, Light 60-74 g, and Mid Weight 96-110 g. An area of any one of manuscript types displayed in the manuscript type area 931 may be selected by a user.

In a case in which any type in the manuscript type area 931 is selected, a user interface window 940 as in FIG. 9D may be displayed.

FIG. 9D illustrates an example user interface window 940 which is displayed when the "manuscript type" is selected.

Referring to FIG. 9D, a user interface window 940 may include an interface window as in FIG. 9B prior to selection of a manuscript type. In this case, the manuscript type selected by a user may be displayed on the manuscript selection area 935. For example, if Light 60-74 g is selected from among the manuscript type area 935, the selected manuscript type "Light 60-74 g" may be displayed on the manuscript selection area 935.

A copy area 941 is a selection area for selecting whether to give a scan command to an image scanning apparatus. When a manuscript type is set, the copy area 941 is selected by a user and the processor 190 may control the image scanning apparatus 100 to perform a scan operation or a copy operation.

FIG. 10 illustrates an example user interface window which is capable of being displayed in a case in which the guide member 160 is moved according to a set angle of the guide member. According to an example, the guide member 160 may be manually positioned at a position having an angle ($\alpha$) of the guide member by a user.

Referring to FIG. 10, a user interface window 1000 includes a message area 1020 requesting a position change of the guide member 160 and an image 1010 for describing a position movement of the guide member 160. In an implementation, an operation manual to move a position of the guide member 160 may be displayed together with the message area 1020 and the image 1010.

The user interface window 1000 may display an image 1010 displaying an image showing a current position of the guide member 160 together with an image showing a state of being positioned at a set angle of the guide member.

In consideration of a current position of the guide member 160 and a relative position of the guide member 160 which has moved to the set angle, it is possible to display a moving direction of the guide member 160 with an arrow and to display a direction in which a user operation is performed.

FIG. 11 is a flowchart illustrating an alignment method of a loading apparatus, according to an example.

A driving process of a loading apparatus 150 including a guide member 160 for automatically aligning a manuscript will be described with reference to FIG. 11.

When a scan command for a manuscript is input, the uppermost manuscript from among manuscripts D stacked on the feed tray 120 is transferred to the manuscript transfer path A to perform scanning, at operation S1110. The manuscript may be supplied to the image sensor 130 along the manuscript transfer path A.

A manuscript D which is initially picked up may be sensed by the manuscript sensor 112. A type of manuscript may be identified through information about the type of manuscript sensed by the manuscript sensor 112, at operation S1120. The manuscript sensor 112 disposed adjacent to the pick up roller 113 may sense information to identify the manuscript type for the manuscript D passing through the manuscript transfer path A.

An angle of the guide member 160 corresponding to the identified manuscript type may be set at operation S1130. The angle of the guide member 160 is set to have an angle at which an appropriate frictional force is applied to the manuscript according to a manuscript type.

For example, the angle of the guide member may be set based on the identified manuscript type. The angle of the guide member 160 corresponding to the type of manuscript may be set through data stored in the memory.

The guide member 160 may be moved to have a set angle, at operation S1140. The guide member 160 may be rotatably moved so that the guide member 160 and the feed tray 120 form the set angle. The guide member 160 positioned at the set angle may be fixed.

The type of manuscript and the position of the guide member 160 may be displayed at operation S1150. The display 30 may display the identified manuscript type and a state of the guide member 160 which has moved to the set angle.

Thereafter, the manuscript may be scanned according to an input scan command, and the scanned manuscript may be stacked on the discharge tray, at operation S1160. The stacked manuscript may be aligned by the guide member 160 which has been moved.

Accordingly, in the image scanning method according to an example, the guide member 160 may be moved according to the type of the scanned manuscript and thus, an alignment of manuscript of various types can be improved. The image scanning method of FIG. 11 may be performed on the image scanning apparatus having the constitution of FIG. 2 or 3, or performed on an image scanning apparatus or scan apparatus having different configuration. The above-described image scanning method according to the example described above may be implemented in a program and provided to image scanning apparatuses. In particular, the program including the example image scanning method may be stored in a non-transitory computer readable medium and provided therein.

FIG. 12 is a flowchart provided to explain an alignment method of a loading apparatus, according to another example.

Referring to FIG. 12, the guide member 160 for aligning a manuscript may be configured such that a manual operation is possible.

First, an angle of the guide member 160 may be set based on an input manuscript type, at operation S1210.

For example, a type of manuscript may be input by a user through the input apparatus 20. The processor 190 may search for an angle of the guide member 160 according to the type of manuscript stored in the memory 40 based on the input manuscript type and set an angle of the guide member.

An operation manual to move the guide member 160 at the set angle may be displayed at operation S1220. The guide member 160 may be configured such that a manual operation is possible. An image showing a current state of the guide member 160 and a state of the guide member 160 having moved to the set angle may be displayed on the display 30. A method for moving the guide member 160 by a user may be shown through the displayed image. The guide member 160 may be configured to be simply manipulated by hand without an additional tool. The guide member 160 may be moved to have a set angle by the manual operation. The guide member 160 positioned at the set angle may be fixed.

Thereafter, the manuscript may be scanned according to an input scan command, 64 and the scanned manuscript may be stacked on the discharge tray, at operation S1230. The stacked manuscript may be aligned by the guide member 160 which has been moved.

Accordingly, in the image scanning method according to an example, the guide member 160 may be moved to have a set angle based on an input manuscript type and thus, the alignment for manuscript of various types may be improved. The image scanning method of FIG. 12 may be performed on the image scanning apparatus having the constitution of FIG. 2 or 3, or performed on an image scanning apparatus or scan apparatus having different configuration.

The above-described image scanning method according to the example described above may be implemented in a program and provided to image scanning apparatuses. In particular, the program including an image scanning method according to examples may be stored in a non-transitory computer readable medium and provided therein.

The foregoing examples are merely examples and are not to be construed as limiting the present disclosure. The present teaching can be readily applied to other types of apparatuses. Also, the description of the examples of the present disclosure is intended to be illustrative, and not to limit the scope of the claims, and many examples, modifications, and variations will be apparent to those skilled in the art.

What is claimed is:

1. An image scanning apparatus, including:
   an image sensor to scan a manuscript;
   a transfer apparatus to pick up the manuscript and move it to a manuscript transfer path;
   a loading apparatus to load the manuscript scanned by the image sensor,
   wherein the loading apparatus includes:
   a discharge tray to hold the manuscript; and
   a guide member to have one end rotatably disposed on the manuscript above an upper part of the discharge tray at an angle formed relative to the discharge tray based on a type of the manuscript; and a processor to set the angle of the guide member based on the type of the manuscript.

2. The image scanning apparatus as claimed in claim 1, wherein the processor is to, based on a thickness of the manuscript being thinner than a predetermined thickness, set the angle of the guide member to not allow the guide member to contact the manuscript.

3. The image scanning apparatus as claimed in claim 1, further including:

a driving member to rotate the guide member, wherein the processor is to control the driving member to position the guide member at the set angle.

4. The image scanning apparatus as claimed in claim 3, wherein the guide member is positioned at a predetermined initial position at an initial operation, wherein the processor is to:

control the driving member to move from the initial position to the set angle; and based on a scan job being completed, control the driving member to allow the guide member positioned at the set angle to return to the initial position.

5. The image scanning apparatus as claimed in claim 4, further including:

a guide member sensor to identify whether the guide member is positioned at the initial position, wherein the processor is to identify whether the guide member is positioned at the initial position based on a signal sensed in the guide member sensor.

6. The image scanning apparatus as claimed in claim 1, further including:

a manuscript sensor to sense a thickness of the manuscript, wherein the processor is to identify the type of the manuscript based on the sensed thickness of the manuscript.

7. The image scanning apparatus as claimed in claim 1, further including:

an input apparatus to receive information about the type of the manuscript, wherein the processor is to identify the type of the manuscript based on the received information and set the angle of the guide member based on the type of the manuscript.

8. The image scanning apparatus as claimed in claim 1, wherein the loading apparatus further includes an inclination member, wherein the inclination member is formed on the discharge tray to upwardly extend to incline relative to the discharge tray, and to provide a frictional force to a rear of the manuscript to align the manuscript.

9. The image scanning apparatus as claimed in claim 8, wherein the guide member includes an inclination surface which is formed to not allow a front end of the manuscript to roll with the guide member in an other end inclined toward the discharge tray.

10. The image scanning apparatus as claimed in claim 9, wherein the inclination surface of the guide member is inclined to correspond to an inclination of the inclination member.

11. An image scanning apparatus, including:

an image sensor to scan a manuscript;

a transfer apparatus to pick up the manuscript and move it to a manuscript transfer path;

a loading apparatus to load the manuscript scanned by the image sensor, wherein the loading apparatus includes:

a discharge tray to hold the manuscript; and a guide member to have one end rotatably disposed on the manuscript above an upper part of the discharge tray at an angle formed relative to the discharge tray based on a type of the manuscript; and a display to display an operation manual of the guide member corresponding to the type of the manuscript.

12. An image scanning method of an image scanning apparatus including an image sensor, a transfer apparatus, a loading apparatus, and a processor, the method including:

picking up a manuscript and transferring the manuscript, using the transfer apparatus, to a manuscript transfer path;

rotating a guide member of the loading apparatus toward a discharge tray of the loading apparatus to set, by the processor, an angle corresponding to a type of the manuscript;

scanning, using the image sensor, the manuscript on the manuscript transfer path; and stacking the scanned manuscript on the discharge tray.

13. The image scanning method as claimed in claim 12, wherein the rotating the guide member includes identifying the type of the manuscript based on a thickness of the manuscript.

14. The image scanning method as claimed in claim 13, wherein the setting the angle of the guide member includes setting the angle of the guide member to not allow the guide member to be in contact with the manuscript based on the thickness of the manuscript being thinner than a predetermined thickness.

* * * * *